Aug. 11, 1959 F. J. OLMER 2,899,281
CATALYTIC OZONE ANALYZER
Filed Nov. 1, 1955
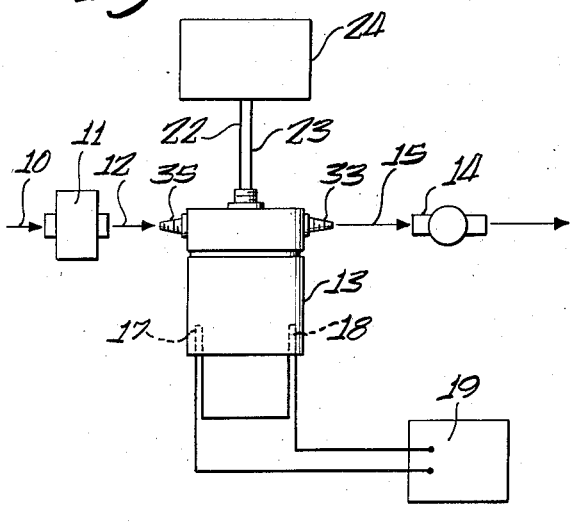
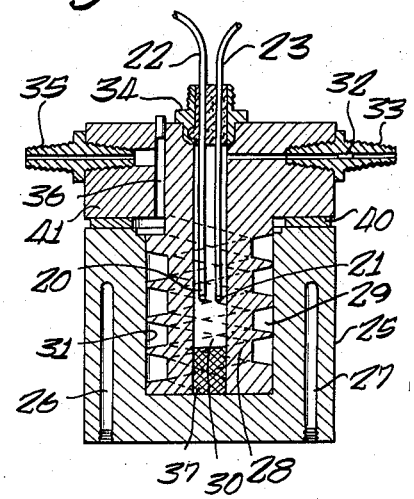
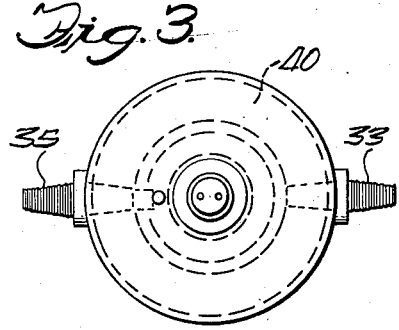
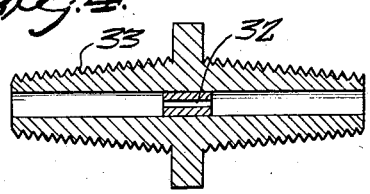
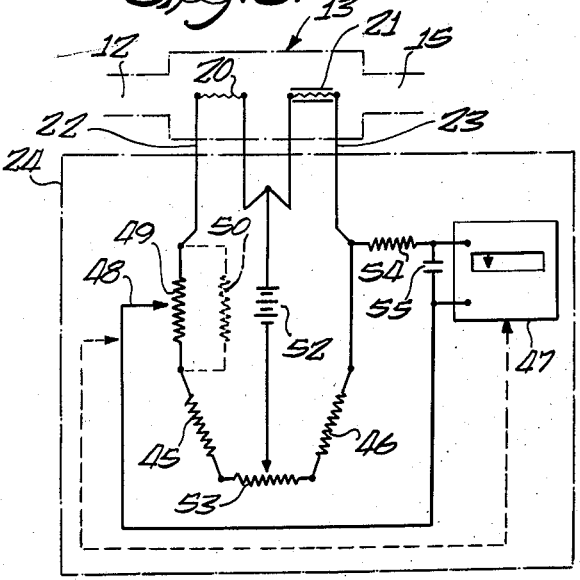
Inventor
Francois J. Olmer
by Everett A. Johnson
Attorney United States Patent Office 2,899,281
Patented Aug. 11, 1959

2,899,281

CATALYTIC OZONE ANALYZER

Francois J. Olmer, Highland Park, Ill., assignor, by mesne assignments, to American Petroleum Institute, New York, N.Y.

Application November 1, 1955, Serial No. 544,302

The entire term of the patent to be granted has been dedicated to the full, free and unrestricted use of the Public 3 Claims. (Cl. 23—254)

This invention relates to apparatus for the continuous analysis of dilute concentrations of ozone in the atmosphere and, more particularly, this invention relates to an apparatus adapted to ascertain the concentration of ozone in a simple gas stream by decomposition thereof under controlled conditions.

Normal concentration of ozone in air is low but some communities having air pollution problems have suspected that larger proportions of ozone are present when the air pollution accompanies an inversion producing smog. Extensive exploratory work has been done in an effort to identify the pollutants responsible for the obnoxious characteristics of smog and, in an effort to determine the role of ozone in the problem, it is desired to analyze the atmosphere for ozone.

Heretofore, many systems have been proposed for analyzing atmospheres for the concentration of ozone, but all of these have been ineffective or impractical for use in connection with this problem. For example, it has been proposed to employ chemical titrating systems, but such systems are not specific to ozone and are not readily adaptable for atmospheric analysis; further, they require skilled technicians for the analysis. Another system attempted for ozone determinations is that of spectographic analysis, but such a system is not rugged, requires skilled interpretation, and is not easily portable since a path of several hundred or thousands of feet is necessary to make the measurement. Still another system which has been attempted is to pass the gas to be analyzed through beds of catalyst adapted to decompose the ozone. However, when the ozone is in minute quantities, the cooling due to adiabatic expansion of the gases through such a catalytic mass voids the effect of the increase in temperature due to ozone decomposition. Thus, no prior system has been both portable and specific to ozone in very low concentrations in the presence of other reactive pollutants.

It is, therefore, a primary object of my invention to provide an apparatus which is readily portable for the making of analyses at widely spaced points and at various levels with respect to the terrain. A further object of the invention is to provide an apparatus which is specific to ozone and, therefore, adapted for analysis of very dilute concentrations of ozone in gas mixtures such as industrially polluted atmospheres. Still another object of the invention is to provide an apparatus which is both inexpensive and rugged. A further object of the invention is to provide an apparatus and testing procedure which is at once both simple and fool-proof so as to not require special skills by the operator. These and other objects of the invention will become apparent as my description thereof proceeds.

Briefly, according to my invention, I provide an analyzer system comprising at least two thermistors in a bridge circuit, one of which is associated with a catalyst effective in decomposing ozone. Catalytic decomposition of ozone on the catalyst-enclosed thermistor results in an evolution in heat and increases the temperature of the thermistor. The matched thermistors are incorporated in a balanced bridge circuit and as the temperature of the catalyst-coated thermistor increases the resistance of this thermistor changes to produce an unbalance in the bridge which depends upon the temperature differential between the thermistors. An electrical signal proportional to the resistance unbalance is obtained which may be recorded on a chart calibrated in terms of parts per million of ozone in the gases flowing over the pair of thermistors giving an almost instantaneous indication of the amount of ozone in the sample stream.

Further details and advantages of my invention will become apparent as the description thereof proceeds with reference to the accompanying drawings wherein:

Figure 1 is a schematic representation of the apparatus;

Figure 2 is a vertical section showing details of the analyzer chamber of Figure 1;

Figure 3 is a top view of the chamber in Figure 2;

Figure 4 is an enlargement of a component in Figure 2; and

Figure 5 is a circuit diagram for the analyzer of Figure 1.

Referring to Figure 1, the sample is drawn through line 10 and filter 11 into sample inlet 12 of the analyzer chamber 13. A pump 14 on outlet line 15 draws the sample through the apparatus.

The analyzer 13 is heated to a constant temperature by any suitable means such as heater 17 and thermostat 18 which controls the power supply 19 to the heater 17. The rate or reaction is substantially independent of temperature. However, it is desired to maintain a uniform or constant temperature in the region of the thermistors 20 and 21 to minimize any fluctuations in the temperature of the gas due solely to changes in the temperature of the sample gas. A pair of thermistors 20 and 21 (see Figures 2 and 5) are connected by leads 22 and 23 to the sensing and indicating circuit 24 shown in more detail in Figure 5.

One form of analyzer chamber 13 found effective in my studies is shown in Figure 2 and includes a generally cylindrical block 25 having a heater well 26 and a thermostat well 27 adapted to receive the heater 17 and thermostat 18, respectively. Within the controlled temperature block or cylinder 25, I provide a sample preheater unit including a hollow cylinder 28 provided with an external helical channel 29 and an internal axial sample well 30. The cylinder 28 is in close fit with the cup 31 so that the helical channel 29 is completed by the walls of the cup 31. At the base of the well 29, I provide a gas distributor 37 which may comprise for example a multi-layered pack of aluminum screens of generally disc shape.

In operation, the sample enters fitting 35, passes downwarly through manifold 36 communicating with the helical channel 29 wherein it is preheated to the selected constant temperature. The preheated gases then pass upwardly through the aluminium wire mesh distributor 37 and upwardly through the well 30, over the thermistors 20 and 21, and out through the orifice 32 and the outlet line 15 under the action of the pump 14.

The cross-sectional flow area of the helical preheating channel 29 and the flow area of the well 30 is substantially constant so that there is no opportunity for adiabatic expansion and cooling of the sample in passing from the inlet 12 to the critical orifice 32 disposed within the outlet fitting 33.

In order to control the flow of gas through the chamber 13, I employ the vacuum pump 14 and the critical orifice 32 interposed the chamber 13 and the suction side of the pump 14. The function of the orifice 32 is to minimize any pumping fluctuations and its design and use are well known to the art and will not be described further.

herein except to point out that it comprises a capillary having a calibrated flow channel therein as illustrated in Figure 4.

The thermistors 20 and 21 are supported within the removable connector 34 and it should be understood that other means for mounting the thermistors within the well 30 can be used without departing from my invention.

The catalytic thermistor 21 may be prepared by any technique which provides a uniform catalytic envelope about the thermistor. For example, it may be first coated with an adhesive and finely divided catalyst dusted onto the adhesive-coated surface. Another means for providing the catalytic envelope is to enclosed the thermistor by a woven glass sleeve and impregnating such sleeve with the catalyst.

The catalyst may comprise finely divided platinum black or finely divided sintered complex oxides of magnesium, iron, nickel, etc., one form of which is available as "Hopcalite" from the Mines Safety Appliance Company.

The heating block 25, having the cup 31, and the hollow cylinder or plug 28 are preferably made of aluminum and an aluminum gasket 40 is provided between the flange 41 on the plug 28 and the upper shoulder 42 of the hollow block 25. Suitable stud bolts (not shown) or the like are provided for securing the flanged plug 28 to the block 25.

With reference to Figure 5, two thermistors 20 and 21 are connected in two legs of the bridge circuit, the two other legs comprising fixed resistors 45 and 46. The unbalance of the circuit caused by the decomposition of ozone is fed into the balancing system of a Brown electronic recorder 47. The balancing motor of the recorder 47 moves the cursor 48 of potentiometer 49 and restores the balance of the bridge.

The sensitivity of the thermistor bridge is of the order of 1 mv./1 p.p.m. of ozone. The amplifier has an input impedance of 120,000 ohms and a sensitivity of 4 microvolts. Thus, a 4 micro-volt signal corresponds to an ozone concentration of 0.004 p.p.m.

The range of the instrument is controlled by the relative resistance values of thermistors 20 and 21, fixed resistors 45 and 47 and potentiometer 49. Thus, the range is easily changed by adding the shunting resistor 50 across the potentiometer 49. The resistances of both thermistor 20 and catalytic thermistor 21 are changed with temperature and the range also changes in approximately the same proportion. For this reason, the relative effect of operating temperature changes will be no greater for an instrument of 0 to 1 p.p.m. range than for one of 0 to 20 p.p.m. range. Thus, the precision for low concentrations of ozone are essentially the same as for high concentrations.

Theoretically, the output of the bridge circuit should not depend upon the temperature maintained within the chamber 13. However, due to extreme difficulty in exactly matching the thermistors, I maintain the system at a temperature varying within narrow limits of about 0.25 and 0.5° C. This may be accomplished by immersing the chamber 13 in a constant temperature bath (not shown) or by providing a block with heater 17 and thermostatic control 18 as illustrated in the drawing. Variations in ambient air temperature do not appreciably influence the instrument readings but to minimize the effect of temperature gradients in the gas passing over the thermistors 20—21 it is preferable to maintain the temperature of the chamber 13 constant within a few degrees of the ambient temperature.

The instrument is sensitive to changes in gas velocity and several factors are involved in controlling the sensitivity to velocity changes. These include the precision with which the thermistors are matched and the manner of coating one thermistor with catalyst. However, the critical orifice 32 has been found to regulate the rate of passage of the gases sufficiently well to minimize this effect.

An important feature of the invention is that the system is specific to ozone in the presence of atmospheric pollutants, whereas chemical and spectrographic analysis systems are not. With respect to pollutants such as organic peroxides, although their proportion may be appreciable, their rate of decomposition is so slow as to have substantially no effect upon the temperature change due to the ozone decomposition.

In a typical analysis, a chamber temperature of about 33° C. was maintained with an air flow rate through the cell of about 100 cc. per minute. It has been found that with a standard gas sample of 1 p.p.m. of ozone in air that a flow rate of about 100 cc. per minute produces the optimum signal for a given ozone concentration. Two physical effects acting in opposite directions contribute to the optimum flow rate. As the flow rate increases more ozone molecules strike the catalyst thus increasing the rate at which heat is evolved and increasing the temperature differential between the coated and uncoated thermistors. Concurrently, however, the heat transfer from the thermistor with the coating is increased thereby lowering the operating temperature of the thermistors and decreasing the sensitivity of the bridge circuit.

The apparatus described has been used to make many tests. The ozone determinations obtained are repeatable and the apparatus may be used to determine ozone concentrations from large values to as low as 2 p.p.h.m. (parts per hundred million). The ultimate sensitivity appears to depend on the precision with which the two thermistors are matched but a sensitivity of about 4 to 5 p.p.h.m. is readily attainable.

The thermistors 20 and 21 are shown in the drawings as being disposed side by side. However, in some circumstances, it may be preferable to vertically displace the two thermistors, placing the catalytically-coated thermistor 21 downstream of standard thermistor 20 with respect to the gas sample passing through the analyzer chamber 13. Likewise, both thermistors may be provided with a glass filter sleeve, only one of which carries the catalyst.

It is preferred that the chamber 13 be fabricated of aluminum, tests having shown that aluminum has a negligible effect on the catalytic decomposition of ozone at low concentration. However, it is contemplated that other materials may be used that are substantially inert to the decomposition of ozone and which have good heat transfer characteristics.

Although I have described my invention with respect to its use in connection with atmosphere studies, it is contemplated that the system can be applied to plant operation control involving analyses of ozone in commercial processes and for the measurement of any unstable gas or gaseous suspension of unstable solids in a fluent stream.

From the description herein it will be apparent that I have attained the objects of my invention and have provided a method and means for the accurate measurement and recording of ozone concentrations in the atmosphere. However, the detailed description of a preferred embodiment of my invention is intended as an illustration only and, accordingly, it is contemplated that changes and modifications can be made in the described systems without departing from the scope of the invention.

What I claim is:

1. An apparatus for detecting and quantitatively indicating the concentration of ozone in the atmosphere which comprises in combination a massive casing of inert metal, a circuitous flow channel through said casing, said flow channel discharging into a test chamber arranged axially of said flow channel, means for establishing a flow of test gases through said channel at a uniform rate, means for maintaining the temperature of said casing at a selected uniform level, detector means including first and second matched thermistors in separate arms of a bridge circuit, the said thermistors being juxtapositioned in said chamber so as to be equally and simultaneously exposed to the sample flow therethrough, the second of said thermistors having associated therewith a quantity of a catalyst specific to accelerating the decomposition of ozone at the maintained temperature, and indicating means in said circuit adapted to measure the unbalance of said circuit due to the heat produced by the catalytic decomposition of ozone on the said second thermistor.

2. An apparatus for the determination of minute concentrations of ozone in the atmosphere which comprises in combination a thermostated constant temperature block, a bore in said block, a removable plug having an external helical recess, said helical recess and said bore providing a tortuous preheating chamber within said block, a test chamber in said plug communicating with said preheating chamber, an inlet and an outlet to said chamber, a gas distribution means across the flow area of said chamber adjacent the inlet thereof, a calibrated orifice adjacent said outlet, detector means including first and second matched thermistors exposed equally and simultaneously to the flow of gases within said chamber between said distribution means and said orifice, circuit means including said thermistors, a catalytic envelope about the second of said thermistors, said catalyst being adapted to decompose ozone at the temperature of said block, and indicator means responsive to the changes in the temperature differentials between said thermistors.

3. In an apparatus adapted for determining the presence of ozone in a flowing gas sample the improvement which comprises a massive temperature-controlled block, a cylindrical recess in said block, plug means adapted to enter said recess, said plug means having a cylindrical portion provided with an exterior helical groove, said plug means and recess together providing a generally helical channel within said block, inlet means to said channel, a test chamber within said plug, the lower end of said chamber being in communication with the lower end of said helical channel, gas distribution means across the flow area of said test chamber, a calibrated restricted orifice providing an outlet from said test chamber, a pair of substantially identical thermistors mounted within said test chamber between said gas distribution means and said outlet, a catalytic envelope about only one of said thermistors, said thermistors being exposed equally and simultaneously to the flowing gas sample, and electrical circuit means including said thermistors adapted to be unbalanced by the heating of one of said thermistors due to the heat of the catalytic decomposition of ozone, the extent of said unbalance being a measure of the concentration of ozone in the flowing gas sample.

References Cited in the file of this patent
UNITED STATES PATENTS

| | | |
|---|---|---|
| 2,149,441 | Jacobson | Mar. 7, 1939 |
| 2,310,472 | Sullivan | Feb. 9, 1943 |
| 2,652,315 | McEvoy | Sept. 15, 1953 |
| 2,720,108 | Johnson | Oct. 11, 1955 |
| 2,743,167 | Cherry | Apr. 24, 1956 |
| 2,749,221 | Gilmont et al. | June 5, 1956 |
| 2,759,354 | Cherry et al. | Aug. 21, 1956 |
| 2,768,069 | Thompson | Oct. 23, 1956 |